Oct. 15, 1968

J. R. KRENN 3,405,982

SELF-ANCHORING BEARING

Filed Dec. 23, 1965

INVENTOR.
JOSEPH R. KRENN

BY
Hopgood & Calimafde
ATTORNEYS.

() # United States Patent Office 3,405,982
Patented Oct. 15, 1968

3,405,982
SELF-ANCHORING BEARING
Joseph R. Krenn, New Britain, Conn., assignor to The Fafnir Bearing Company, New Britain, Conn., a corporation of Connecticut
Filed Dec. 23, 1965, Ser. No. 515,837
1 Claim. (Cl. 308—236)

ABSTRACT OF THE DISCLOSURE

An antifriction bearing is disclosed in which an exposed cylindrical surface of one of the bearing rings by which the bearing is mounted is characterized by splines comprising a plurality of V-grooves spaced about the circumference and running from one edge of the cylindrical surface to the other in the axial direction of the bearing. The size of the splines are such as to provide an interference fit with a bearing support having a cylindrical mounting surface when the bearing is concentrically force-fitted onto the bearing support, such that the crests of the V-grooves cut into the cylindrical surface of the mounting and anchor the bearing thereto.

---

This invention relates to an antifriction bearing and, more particularly, to a self-anchoring bearing having means associated with the circumferential surface of a bearing ring as in a journal bearing, or means associated with one of the bearing rings of a bearing containing ball elements, for example the inner ring, for anchoring the bearing to its bearing support, such as on a shaft or in a housing.

Various devices now in use for holding the inner ring of an antifriction bearing on its mounting suport, e.g. a shaft, are subject to some disadvantages. Bearings frequently must be mounted on shafts which have a loose fit with the inner ring. In these situations, devices such as set screws, lugs, and the like, for holding the inner ring to the shaft are subject to the disadvantages that such holding means are often unable to prevent differential rotation of the ring with respect to the shaft.

It has been known to knurl shafts to provide high points to give a desired press-fit with a bearing ring. However, such methods have not been too satisfactory for the reason that there is a limit to the amount of oversize obtainable by this method. Moreover, the high points tend to peen over as a hardened bearing ring is press- or force-fitted thereon, whereby the desired interference fit is not always obtained.

It is thus the object of this invention to provide a self-anchoring antifriction bearing capable of providing the desired effective interference fit with a bearing support or mounting without causing excessive radial preload within the bearing.

Another object is to provide the combination of a self-anchoring antifriction bearing and a mounting wherein the circumference of a bearing ring is uniformly anchored to a circumferential surface of a mounting concentric with the bearing ring.

These and other objects will more clearly appear when taken in conjunction with the following disclosure and the accompanying drawing, wherein.

Figure 1:
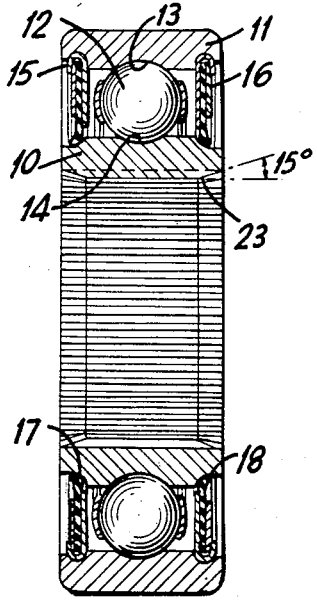
FIGS. 1 and 2 are illustrative of one embodiment of the invention in which the bore of the inner bearing ring is splined with V-grooves running from one edge of the ring to the other.

Stating it broadly, the invention provides a cylindrical antifriction bearing having a bearing ring wherein the exposed surface of which is splined to enable the bearing to be force-fitted to a corresponding cylindrical mounting surface.

In a preferred aspect, the invention provides an antifriction bearing having inner and outer bearing rings with antifriction bearing elements interposed therebetween, an exposed cylindrical surface of one of the bearing rings being characterized by splines comprising a plurality of V-grooves spaced about the circumference and running from one edge of the cylindrical surface to the other in the axial direction of the bearing. The size of the V-grooves is such as to provide an interference fit with the cylindrical bearing mounting when the bearing is concentrically force-fitted onto the bearing mounting, such that the crests of the V-grooves cut into the cylindrical surface of the mounting and anchor the bearing thereto.

Where the bearing is mounted on a shaft, the bore of the inner ring is splined. On the other hand, where the bearing is mounted within a cylindrically bored housing, the outer cylindrical surface of the outer ring is splined to form an interference fit with the bore of the housing. In this connection, such a mounting may be employed for a journal bearing.

An advantage of the invention is that where the bearing is to be force-fitted on a shaft, the shaft need not be highly precise. A low cost mild steel shaft may be employed having a tolerance of a few thousandths of an inch. The ring force-fitted on the shaft would, of course, be in the hardened condition so that the splines will cut into the surface of the mounting. In a normal press fit, that is where a conventional bearing ring without splines is force-fitted on a shaft of almost one inch in diameter, the shaft diameter might vary from 0.9847 to 0.9844 inch. The inner ring might have a diameter ranging from 0.9843 to 0.9838 inch and vary up to about 0.0008 inch undersize relative to the diameter of the shaft. An inner ring with the smallest diameter (0.9838 inch) on a shaft with the largest diameter (0.9847 inch) would result in a maximum interference of 0.0009 inch. When a ring of such undersize dimension is forced on the foregoing shaft, the ring may expand substantially in diameter, such that up to about 75% or more of the interference goes into the expansion of the ring. The radial clearance in standard precision bearings is sufficient to accommodate the expansion of the inner ring with no significant increase in the friction between the balls and the bearing rings. However, commercial grade shafting with a 1″ diameter has a tolerance of the order of 0.0025 inch and this shafting can not be used for press fitting into bearings with standard radial clearances. The press fitting of shafting with a diameter on the high side of the tolerance would cause radial preload in the bearings and increasing the clearance in the bearings would result in excessive looseness and shaft vibration when used with shafting with a diameter on the low side of the tolerance.

However by using a spline construction on the cylindrically bored surface of the inner ring, a force fit is obtainable with much less expansion of the inner ring. The advantages of the invention will be apparent by referring to FIG. 1 which shows one form of an antifriction bearing comprising an inner bearing ring 10 concentrically located within outer bearing ring 11 with ball elements 12 interposed therebetween, the balls riding in raceway grooves 13 and 14, respectively. Annular grooves may be provided on the inner surface of the outer ring into which annular seals 15, 16 are mounted, the free end of the seal riding on lands 17 and 18 of the inner ring.

Figure 2:
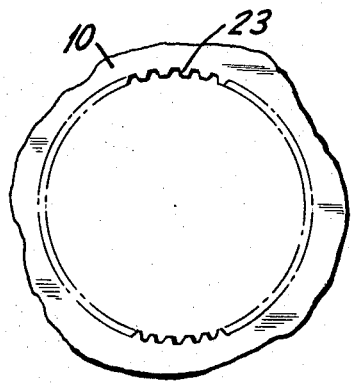

The cylindrical surface or bore of the inner ring is splined with V-grooves running from one edge of the bearing to the other in the axial direction of the bearing. For clarity, this is shown in FIG. 2 which is an elevation view looking into the bore of the bearing. The grooves shown may be produced by broaching, the grooves in the embodiment shown being approximately 6° apart along the circumference of the bore.

Figure 3:
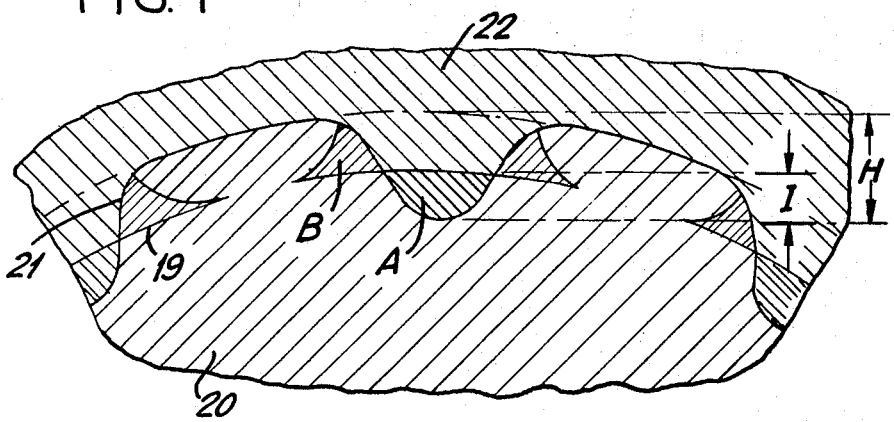
FIG. 3 shows in enlarged profile the relationship of the splines of the bore of the inner ring and the surface of a shaft or the O.D. of an outer bearing ring and the housing into which the splines are force fitted.

In FIG. 3, an enlarged profile is depicted showing the relationship between the surface 19 of a shaft 20 and splines 21 of the bore of the inner ring 22. The extent of the interference fit will be observed from the shaded areas shown in the drawing. Area A shows the extent the crests of the splines are embedded into the surface of the shaft. In order to force fit the splined bore of the inner bearing ring, it is important that the edge of the bearing 23 be bevelled, for example bevelled at an angle of about 15° with the axis, so that the bearing can be forced onto the shaft. As the crest of the splines plow into the surface of the shaft, mounds of shaft metal are formed resulting in an increase in the effective diameter of the shaft.

As shown in FIG. 3, the shaft metal displaced is shown by area B which comprises in cross-section about 45% of area A. The depth of the groove formed in the surface of the shaft, or interference fit I, may vary from about 0.3 to about 0.6 times the total height H of the crest of the splined bore of the inner ring. The force-fit obtained is so uniformly distributed about the shaft as to establish a substantially non-slip anchoring of the bearing to the shaft. Assuming a shaft diameter of about 0.985 inch and a splined diameter of about 0.975 inch, the interference fit is about 0.010 inch. Assuming H to be about 0.020 inch, the interference fit would calculate to about 0.5 times H. For the purpose of this invention, H may be defined as the distance between the top of the crest and the valley of the spline.

Figure 4:
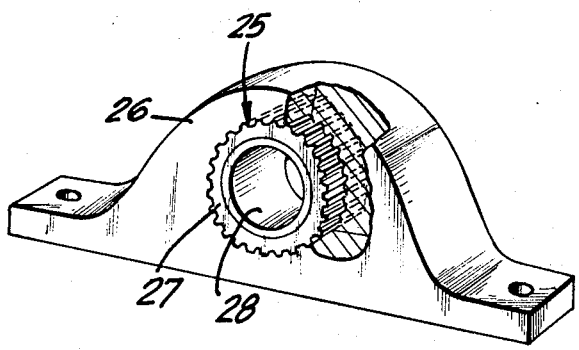
FIG. 4 is illustrative of a journal bearing mounted in a housing.

In FIG. 4, a journal bearing mounting is shown. The bearing 25 is mounted in a housing 26. The bearing comprises a cylindrical metal ring 27 having bonded to its bore an antifriction liner or bearing element 28 which may comprise babbit metal, copper, brass, or a non-metallic liner, such as a liner comprising polytetrafluoroethylene.

Figure 5:
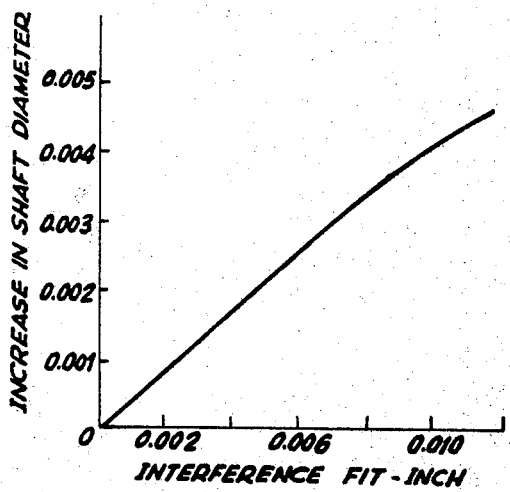
FIGS. 5 to 7 are graphs showing the relationship between the interference fit and (1) the increase in shaft diameter, (2) applied force in pounds in mounting the bearing ring and (3) radial play of the inner to the outer ring, respectively.

The interference relationship wherein the shaft diameter (about 0.985 inch) is effectively increased depending upon the amount of interference is shown in FIG. 5. As will be noted, a substantially straight line relationship is obtained for interference fits of up to about 0.01 inch. Thus, for an interference fit of about 0.008 inch, the shaft diameter is increased about 0.0035 inch.

Figure 6:
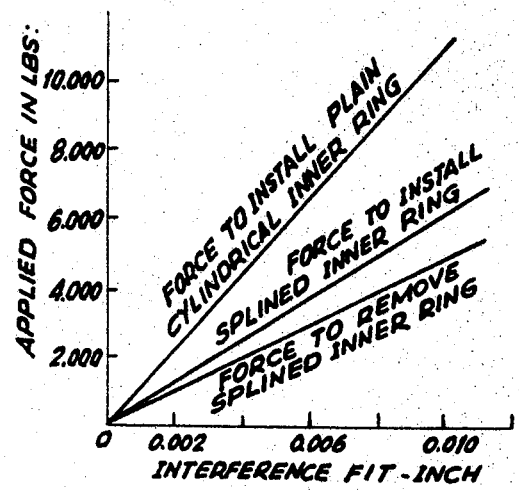

One of the advantages of using a splined bore in force-fitting an inner bearing ring upon a shaft is that the amount of force required to force the splined ring on the shaft is much less than that required to force-fit an unsplined ring. This is clearly shown in FIG. 6. Note that less force is normally required to remove the splined inner ring from the shaft.

Figure 7:
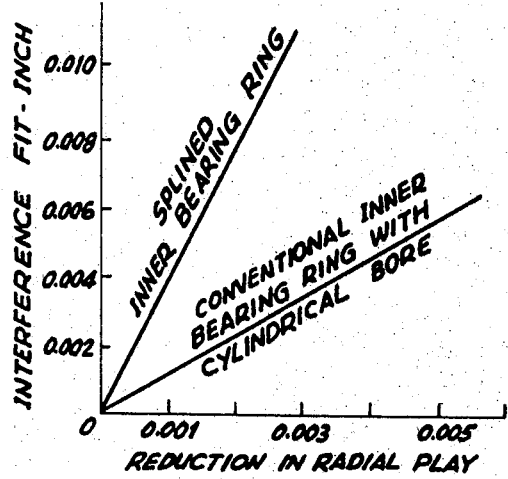

Another advantage of using the splined inner ring is that the amount of expansion during force-fitting (for a given interference fit) is much less than that of a plain cylindrical inner ring. Thus, referring to FIG. 7, it will be noted that for interference fits of up to about 0.01 inch, the reduction in radial play of a bearing with the splined bore is about 25%, whereas the reduction in radial play of the same bearing with a plain cylindrical ring is about 86%.

While the examples shown are directed to splined inner rings, substantially the same holds true in determining the interference fit for splined outer rings where a bearing is to be supported and held within a cylindrical bearing housing. This also applies for a journal bearing. Thus, where the total height of the spline on the outer ring is H, the interference I would similarly range from about 0.3 to 0.6 times H. The terms "bearing elements" or "bearing means" employed herein are meant to include bearing liners as well as ball elements.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claim.

What is claimed is:

1. In combination, a bearing support having a cylindrical mounting surface in the form of a shaft and an antifriction bearing comprising inner and outer bearing rings with antifriction bearing elements interposed therebetween, said inner bearing ring being edge bevelled and being force-fitted concentrically on said shaft, the contacting cylindrical surface of said inner bearing ring being characterized by splines comprising a plurality of V-grooves spaced about the circumference of the inner cylindrical surface of said inner bearing ring and running from one edge of the cylindrical surface to the other in the axial direction of the bearing, the size of the splines being such as to provide an interference fit with the shaft, wherein the crests of the V-grooves are embedded into the shaft such that the interference fit ranges from about 0.3 to 0.6 times the total height of the splines, thereby anchoring the bearing to said shaft with minimum radial play.

References Cited

UNITED STATES PATENTS

| 2,119,334 | 5/1938 | Leffler | 287—53 |
| 2,279,955 | 4/1942 | Sipe | 287—53 |
| 2,345,910 | 4/1944 | Fawcett | 287—53 |
| 2,779,641 | 1/1957 | Sutowski | 308—236 X |
| 3,052,956 | 9/1962 | Daugherty | 308—236 X |
| 3,066,000 | 11/1962 | James et al. | 308—236 |
| 3,111,334 | 11/1963 | Krizman | 287—93 X |
| 3,298,750 | 1/1967 | Storch | 308—2 |

JAMES W. WESTHAVER, *Primary Examiner.*

R. A. DUA, *Assistant Examiner.*